(12) United States Patent
Allen et al.

(10) Patent No.: US 8,171,495 B2
(45) Date of Patent: May 1, 2012

(54) QUEUE DISPATCH USING DEFERRED ACKNOWLEDGEMENT

(75) Inventors: Nicholas Alexander Allen, Redmond, WA (US); Edmund Samuel Victor Pinto, Duvall, WA (US); Karthik Raman, Issaquah, WA (US); David Leon Stucki, Bellevue, WA (US); John Anthony Taylor, Bellevue, WA (US); Kenneth David Wolf, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1007 days.

(21) Appl. No.: 12/129,580

(22) Filed: May 29, 2008

(65) Prior Publication Data

US 2009/0300652 A1    Dec. 3, 2009

(51) Int. Cl.
| | |
|---|---|
| G06F 13/00 | (2006.01) |
| G06F 9/46 | (2006.01) |
| G06F 15/173 | (2006.01) |
| G06F 17/00 | (2006.01) |
| H04J 4/00 | (2006.01) |
| H04H 20/71 | (2008.01) |
| H04L 12/28 | (2006.01) |

(52) U.S. Cl. ........ 719/314; 718/101; 718/106; 709/228; 707/679; 707/682; 707/684; 707/703; 707/704; 370/307; 370/312; 370/390

(58) Field of Classification Search .................. None
See application file for complete search history.

(56) References Cited

U.S. PATENT DOCUMENTS

| | | | | |
|---|---|---|---|---|
| 4,851,988 | A | * | 7/1989 | Trottier et al. ............ 709/226 |
| 5,548,760 | A | | 8/1996 | Healey |
| 5,802,310 | A | | 9/1998 | Rajaraman |
| 6,170,003 | B1 | | 1/2001 | Benkual et al. |
| 6,401,145 | B1 | | 6/2002 | Baskey et al. |
| 6,922,414 | B1 | | 7/2005 | Gunlock |
| 6,950,669 | B2 | | 9/2005 | Simonsson |
| 7,162,513 | B1 | | 1/2007 | Kister et al. |

(Continued)

FOREIGN PATENT DOCUMENTS

WO    WO2008000127 A1    3/2008

OTHER PUBLICATIONS

Messaging Passing (2 pages) http://www.osdev.org/osfaq2/index.php/Message%20Passing, (Jun. 15, 2006).
Using Message Queue Services in .NET—Apr. 16, 2007 (4 pages) http://www.builderau.com.au/program/dotnet/soa/Using-message-queue-services-in-NET/0,339028399,339274877,00.htm.
Workflow Message Queue's Performance Effect Measurements on an EJB-Based Workflow Management System 2007 (12 pages) http://www.springerlink.com/content/323n65432874x31t/fulltext.pdf.

(Continued)

*Primary Examiner* — S. Sough
*Assistant Examiner* — Phuong Hoang
(74) *Attorney, Agent, or Firm* — Workman Nydegger

(57) ABSTRACT

Dispatching an incoming message from a queue into message transfer session(s) from which message consumers may draw messages. The message is reversibly received from the queue, whereupon a context of a message is identified. If the context correlates to an existing message transfer session, the message is ultimately assigned to a message transfer session. If the context does not correlate to an existing message transfer session, a new message transfer session is created, and the message is assigned to that new message transfer session. Upon receiving an acknowledgement of successful processing of the message, the removal of the message from the queue-like communication medium is assured. Upon receiving an acknowledgement of unsuccessful processing of the message, the message is restored to the queue-like communication medium.

19 Claims, 7 Drawing Sheets

U.S. PATENT DOCUMENTS

| | | |
|---|---|---|
| 7,200,676 B2 | 4/2007 | Christensen et al. |
| 7,260,610 B2 | 8/2007 | Grooters et al. |
| 7,301,970 B2 | 11/2007 | Kim et al. |
| 2003/0067916 A1* | 4/2003 | Deml et al. ................... 370/390 |
| 2003/0212818 A1 | 11/2003 | Klein et al. |
| 2005/0267947 A1 | 12/2005 | Patrick et al. |
| 2006/0069596 A1 | 3/2006 | Hatoun et al. |
| 2006/0168052 A1 | 7/2006 | Srinivasan et al. |
| 2007/0050488 A1 | 3/2007 | Joyner et al. |
| 2007/0177195 A1 | 8/2007 | Rebert et al. |
| 2008/0133642 A1* | 6/2008 | Balassanian ................... 709/201 |
| 2008/0229329 A1* | 9/2008 | Ayres et al. ................... 719/314 |

OTHER PUBLICATIONS

GSFL: A Workflow Framework for Grid Services, Filed 2002 (13 pages) http://users.sdsc.edu/~sriram/publications/gsfl.pdf.

XML-enabled Workflow Management for E-Services across Heterogeneous Platforms, Filed 2001 (19 pages) http://citeseer.ist.psu.edu/cache/papers/cs/14983/http:zSzzSzwww-dbs.cs.uni-sb.dezSz~gillmannzSzPublicationszSzXML-TES.pdf/shegalov01xmlenabled.pdf.

* cited by examiner

QUEUE DISPATCH USING DEFERRED ACKNOWLEDGEMENT

BACKGROUND

Our modern connected world is facilitated by message processors communicating messages back and forth. A message processor may be quite complex such as a fully capable computing system or even a collection of computing systems. A message processor may also be considered as an application. Message processors frequently use queues to exchange messages reliably while providing isolation between message processors. Queues allow message processors (i.e., "senders") to send messages at any time without requiring a direct connection to the message processor (i.e., the "consumer") that handles the message. This allows the message processors to be spatially and temporally decoupled. A consumer application consumes messages from a queue by removing the message at the head of the queue and processing its contents. As the consumer and sender do not coordinate message transmission, the consumer commonly processes messages in a continuous fashion.

Workflow is an application development technology that provides scenarios for which continuous message processing is undesirable. Authoring a message consumer in the form of a workflow that is capable of processing any message at any time is generally regarded as a difficult development task. Therefore, a workflow application is typically an intermittent consumer of messages. At any instant, the workflow application can only process a subset (possibly an empty set) of the possible application messages; the message at the head of the queue may not be in this set.

A workflow application may share a single queue among multiple instances. Each instance has its own set of currently processable messages and messages for an instance that is ready to process messages may sit in the queue behind messages for an instance that is not ready to process messages.

A known solution to the intermittent consumer problem is to demultiplex the messages so that each consumer reads from an independent physical queue. Thus, a message for one consumer that is not yet ready to process messages may be placed in a physically distinct queue as compared to a message for a consumer that is ready to process the message.

BRIEF SUMMARY

Embodiments described herein related to mechanism for dispatching an incoming message from a queue-like communication medium into message transfer session(s) from which one or more message consumers may draw messages. The message is reversibly received from the queue, whereupon a context of a message is identified. If the context correlates to an existing message transfer session, the message is ultimately assigned to a message transfer session, whether it be that existing message transfer session, or whether it be another message transfer session that also corresponds to that context after perhaps some waiting period. If the context does not correlate to an existing message transfer session, a new message transfer session is created, and the message is assigned to that new message transfer session. Upon receiving an acknowledgement of successful processing of the message, the removal of the message from the queue-like communication medium is assured. Upon receiving an acknowledgement of unsuccessful processing of the message, the message is restored to the queue-like communication medium.

This mechanism allows a single physical queue to be used for multiple consumers, since the message is not permanently or at least is not irreversibly removed from the queue until the message is fully processed. In addition, once the message is received from the queue, the message that remains in the queue is in a state that it cannot be again received until the previous processing attempts of the message have been resolved.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, an incoming message from a queue is provided into a corresponding message transfer session from which message consumers may draw messages. The message is reversibly received from the queue, whereupon a context of a message is identified. If the context correlates to an existing message transfer session, the message is ultimately assigned to a message transfer session after potentially being set aside as described below. If the context does not correlate to an existing message transfer session, a new message transfer session is created, and the message is assigned to that new message transfer session. Upon receiving an acknowledgement of successful processing of the message, the removal of the message from the queue-like communication medium is final. Upon receiving an acknowledgement of unsuccessful processing of the message, the message is restored to the queue-like communication medium.

First, some introductory discussion regarding message processors will be described with respect to FIGS. 1A and 1B. Then, various embodiments of a message dispatch engine will be described with respect to FIGS. 2 through 7.

A message processor may be implemented in software or hardware, or a combination thereof. FIG. 1A illustrates a computing system, which may implement a message processor in software. Computing systems are now increasingly taking a wide variety of forms. Computing systems may, for example, be as handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems. That said, a "message processor" is not even limited to use in a computing system at all.

Figure 1A:
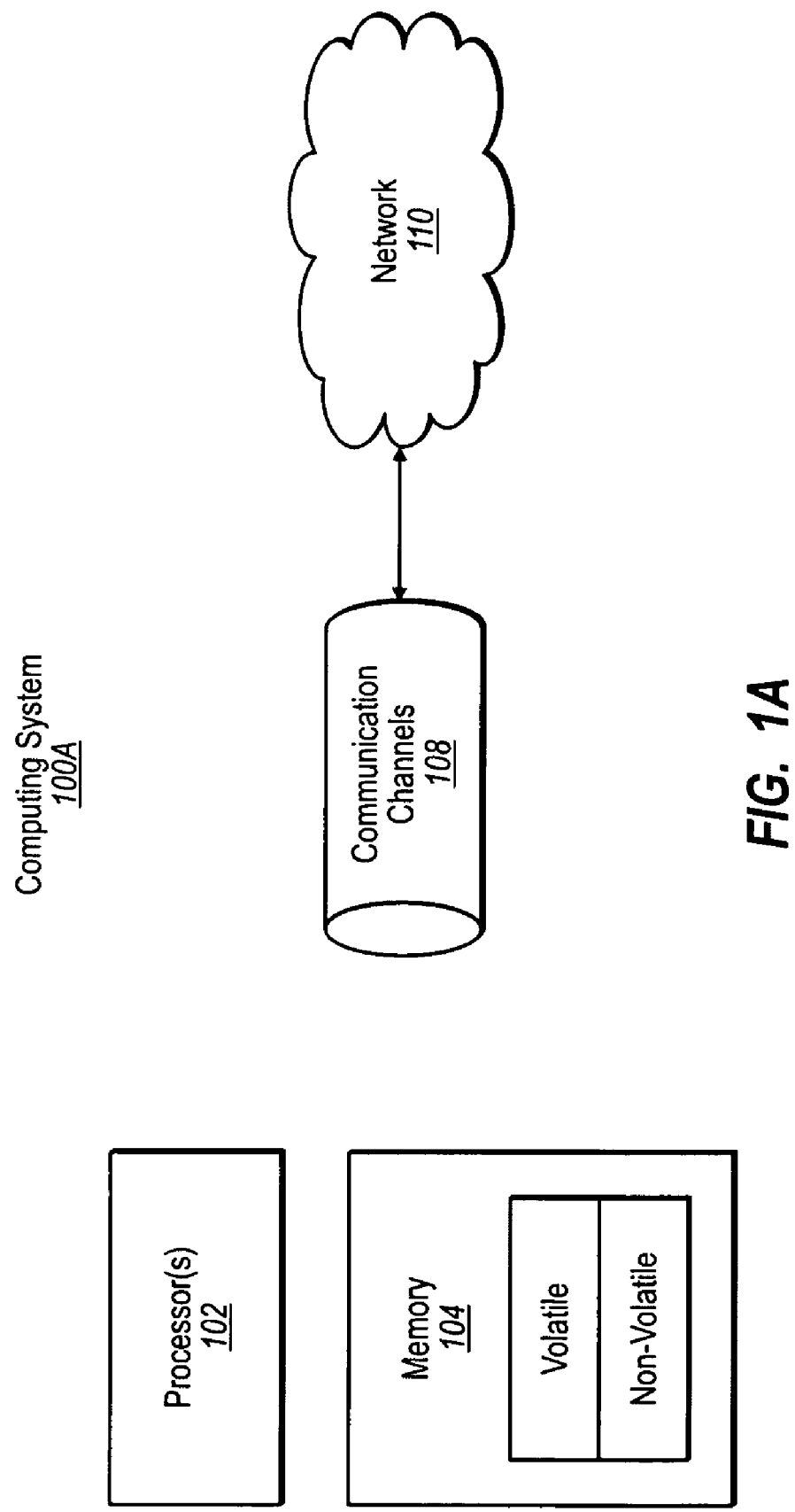
FIG. 1A illustrates one example of a message processor in the form of a computing system.

FIG. 1A illustrates a message processor in the form of a computing system 100A. In its most basic configuration, a computing system 100A typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

As used herein, the term "module" or "component" can refer to software objects or routines that execute on the computing system. The different components, modules, engines, and services described herein may be implemented as objects or processes that execute on the computing system (e.g., as separate threads). However, as will be described further below with respect to FIG. 1B, the message processor may be implemented as a state machine as well, perhaps even fully in hardware.

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100A.

Computing system 100A may also contain communication channels 108 that allow the computing system 100A to communicate with other message processors over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Figure 1B:
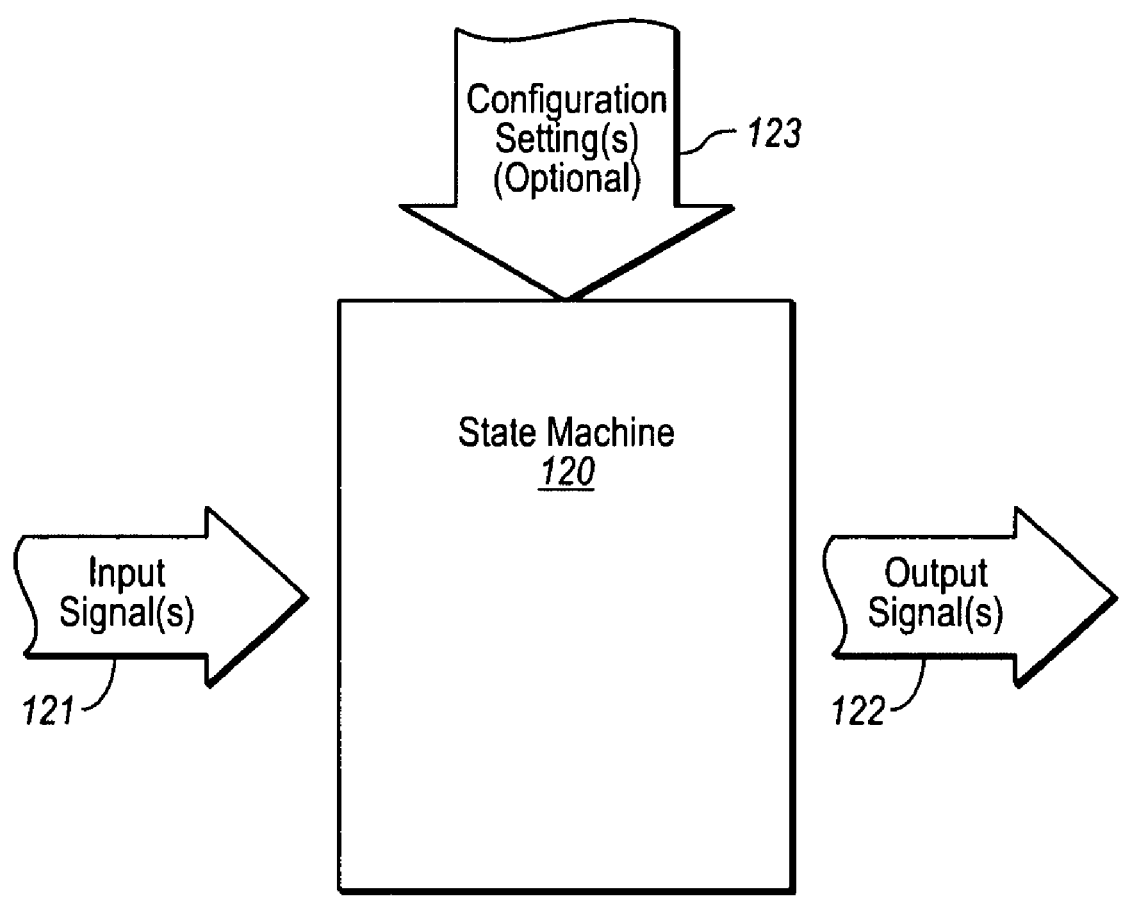
FIG. 1B illustrates another example of a message processor in the form of a state machine.

FIG. 1B illustrates a message processor in the form of a state machine 120. A state machine 120 may be implemented entirely in hardware, although that need not be the case. The state machine 120 receives input signal(s) 121, and deterministically generates output signal(s) 122. Optionally, the deterministic function may depend on one or more optional configuration settings 123. In one embodiment, the state machine 120 may be implemented using logic gates and potentially other circuit components such as perhaps registers and clocks. When implemented as a message processor, the state machine 120 may perform the message dispatch described herein.

Now that example message processors have been described, FIG. 2 will as now be described, which illustrates a particular messaging processing environment 200. The various illustrated components may be implemented in software or hardware. For instance, if a given component is implemented in software, the computing system 100A of FIG. 1A may cause the component to be created and operated by the processor(s) 102 executing computer-executable instructions from the memory 104. If implemented in hardware, the component may be a computing system or device.

Figure 2:
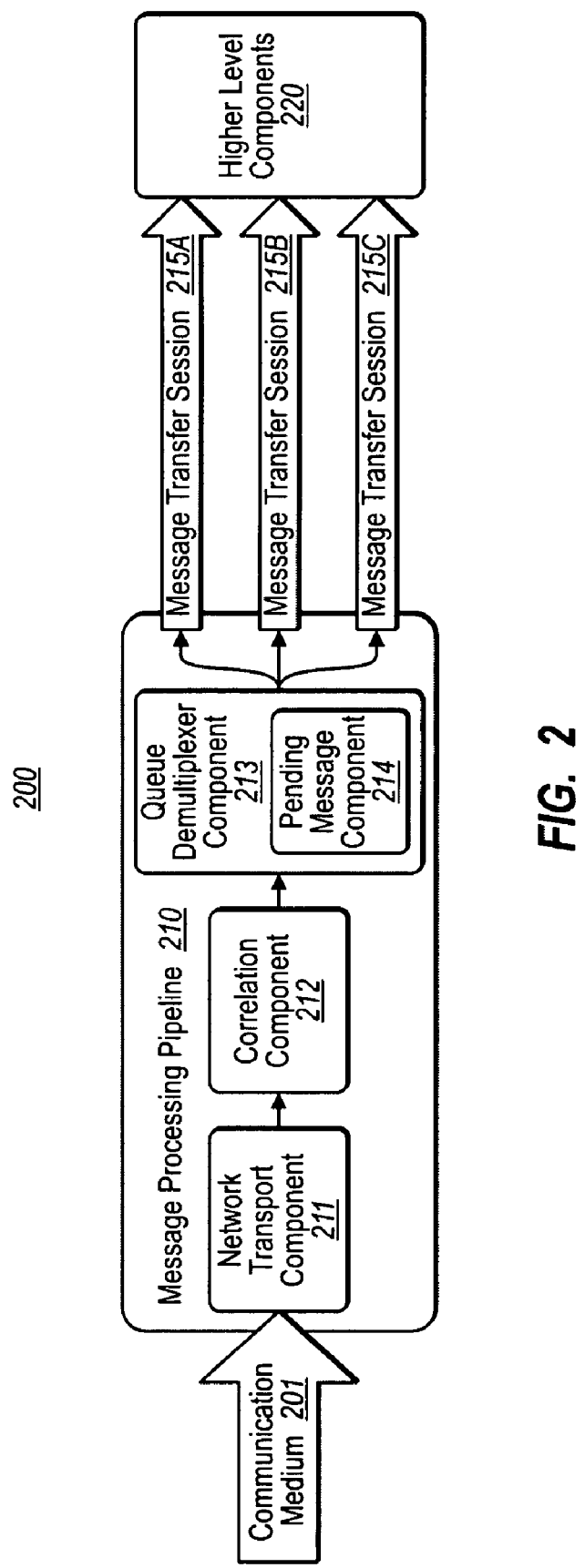
FIG. 2 schematically illustrates a message processing environment in which message may be drawn from a queue-like communication medium, and dispatched to a corresponding message transfer session, whereupon the messages may be consumed by various message consumers.

Referring to FIG. 2, the environment 200 includes a queue-like communication medium 201 that may receive messages from one or more message senders. The "queue-like" communication medium could be a queue, but could also be a file system, a database, a mailbox, a File Transfer Protocol (FTP) server, or any other communication medium that permits message exchange using a one-way pattern. Additionally, a queue-like communication medium allows a reversible receive operation to be performed on message read from the queue-like communication medium. In particular, messages may be read from the queue without immediately removing the message from the queue or at least while retaining the ability to restore the message back into the queue for at least a temporary period of time.

In the example environment 200, the queue-like communication medium 201 (also referred to hereinafter as a "queue" or a "communication medium") may have several addition properties. The communication medium 201 may decouple the reading of the message contents from the acknowledging receipt of the message. In addition, the communication medium 201 may preserve the contents of the communication medium when, for example, a consuming application corresponding to a particular message is not available. The communication medium 201 may also as prevent permanent disabling of the message processing environment 200 when a poisonous message is transmitted. Furthermore, consider that the application consists of a plurality of consumers, some of which are not ready to receive particular application messages. It would be beneficial for both the timeliness and correctness of message processing that the inability to process a particular application message by a consumer does not interfere with processing other messages in the communication medium 201.

Referring to FIG. 2, the environment 200 also includes a message processing pipeline 210 that contains a network transport component 211, a correlation component 212, and a queue demultiplexer component 213 that includes a pending message component 214. The network transport component 211 receives messages from a communication medium 201. The correlation component 212 identifies the application context associated with a message. The demultiplexer component 213 then organizes messages into message transfer sessions. For instance, in FIG. 2, the queue demultiplexer component 213 is surfacing three message transfer sessions 215A, 215B and 215C to higher level components 220. However, the message processing pipeline 211 may open new message transfer sessions, and close existing transfer sessions. The higher level components 220 draw messages from the message transfer sessions and process those messages.

Figure 3:
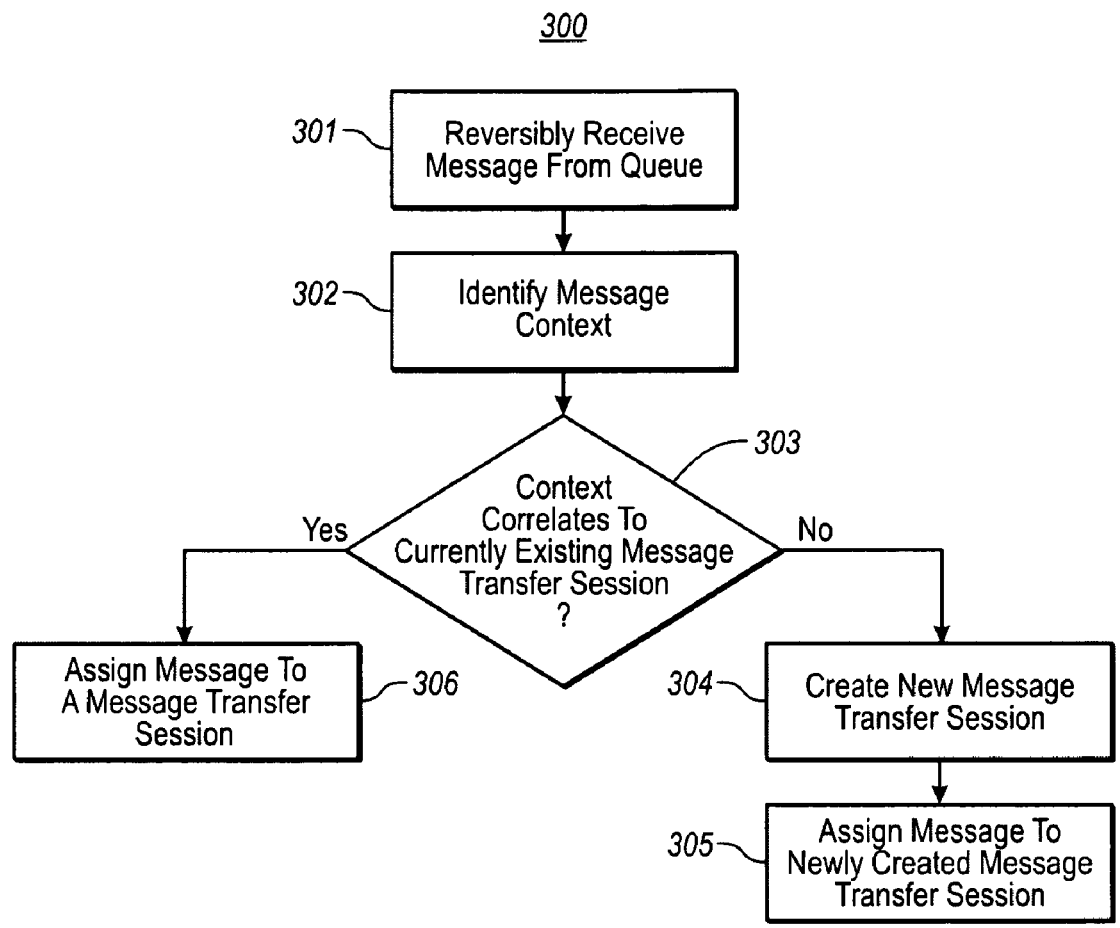
FIG. 3 illustrates a flowchart of a method for dispatching an incoming message from a queue-like communication medium into one of any number of message transfer sessions from which message consumers may draw messages.

FIG. 3 illustrates a flowchart of a method 300 for dispatching an incoming message from a queue-like communication medium into one of one or more message transfer sessions from which one or more message consumers may draw messages. The method 300 may be performed in the environment 200 of FIG. 2 by the message processing pipeline 210. Accordingly, the method 300 of FIG. 3 will be described with frequent reference to the environment 200 of FIG. 2 as an as example implementation only.

The method 300 is performed each time a message is reversibly received from the communication medium 201. Thus, the method 300 may be repeatedly performed, and even multiple occurrences of the method 300 may be performed concurrently. The messages received from the communication medium 201 may each represent a single message, or may be a batch of messages. For instance, the communication medium 201 may receive message transfer sessions from upstream components in perhaps a very similar way as the environment 200 surfaces message transfer sessions to the downstream higher level components 220.

The messages received from the queue-like communication medium 201 may be transacted messages or non-transacted messages. A "transacted" message is a message that is to be processed as a transaction using the transaction framework of the system. That is, if the processing of the transacted message is successful, then the state of the message consumer and communication medium has successfully moved from its pre-transaction state to a new post-transaction state. However, if the processing of the transacted message is not successful, then the state of the message consumer and the message within the communication medium is rolled back to its pre-transaction state. A "non-transacted" message is a message that is not to be processed using the transaction framework of the system. The transacted and non-transacted cases may be handled somewhat differently, but both cases are enabled using the environment 200 in conjunction with the method 300.

Figure 4A:
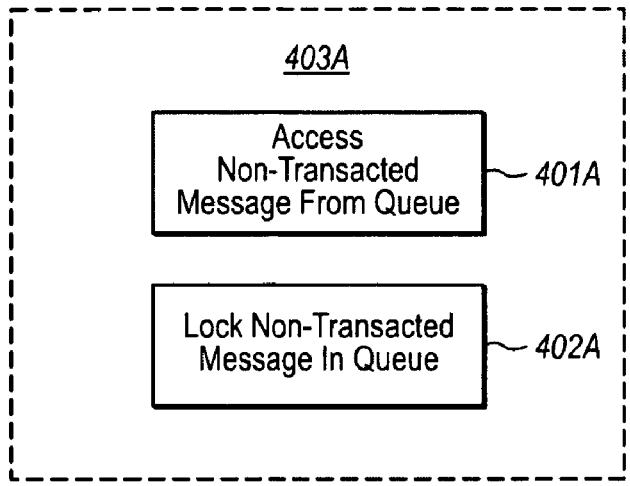
FIG. 4A illustrates a flowchart of a method for reversibly receiving a message from a queue-like communication medium in the non-transacted message case.
Figure 4B:
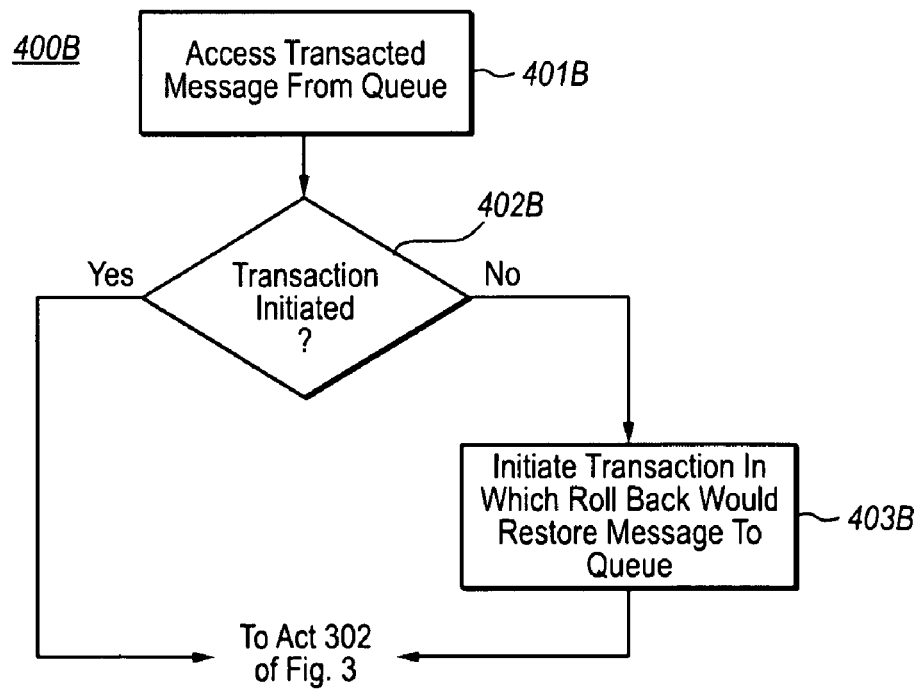
FIG. 4B illustrates a flowchart of a method for reversibly receiving a message from a queue-like communication medium in the transacted message case.

Returning to FIG. 3, the message is reversibly received from the queue-like communication medium (act 301). For instance, in FIG. 2, the network transport component 211 requests a message from the communication medium 201 using a deferred acknowledgment pattern. In this description and in the claims, a as message is "reversibly received" from a component if the message may be restored in the component to its state in which it existed prior to the receive operation. If, for example, the deferred acknowledgement of the message receipt indicates that the message was not properly received, the effects of receiving the message for the communication medium 201 may be reversed. This reversible removal may be enforced by the environment 200, by the sender of the message, or perhaps by some other third party computing system. For instance, FIG. 4A illustrates a flowchart of a method 400A for reversibly receiving a message from a queue-like communication medium in the non-transacted message case. FIG. 4B, in contrast, illustrates a flowchart of a method 400B for reversibly receiving a message from a queue-like communication medium in the transacted message case.

The receiving of a non-transacted message will first be described with respect to FIG. 4A. This receiving may be referred to as a "peak-lock", and may be described as a non-destructive read operation. In the non-transacted message case, the message is accessed from the queue-like communication medium 201 without removing the message from the queue-like communication medium (act 401A). For instance, perhaps a handle to a copy of the message contents is received for processing, but the message itself is retained within the queue-like communication medium.

In addition, the message is locked in the queue-like communication medium 201 (act 402A) such that the message within the queue is not accessed while the message is locked, but is rather skipped when messages are subsequently accessed from the queue-like communication medium. Although the message is locked, the message processing pipeline 210 and the higher level components 220 may process a copy of the message contents.

The acts 401A and 402A are shown surrounded by a dashed box 403A to emphasize that the accessing of the non-transacted message from the communication medium (act 401A), and the locking of the non-transacted message in the communication medium (act 402A) are performed in conjunction with each other.

FIG. 4B illustrates a flowchart of a method 400B for reversibly receiving a message from a queue-like communication medium in the transacted message case. The transacted message is accessed from the queue-like communication medium (act 401B). In this case, however, a copy of the message is not retained within the communication medium. If a transaction is already initiated (e.g., by the sender or a third party, or by the receiver in response to a prior message of the transaction being received (Yes in decision block 402B), the process simply proceeds to act 302 in FIG. 3. On the other hand, if a transaction is not yet initiated for the transacted message (No in decision block 402B), a transaction is initiated (act 403B), such that a roll back of this transaction would restore the message into the queue-like communication medium.

Accordingly, even though the transacted message is deleted from the communication medium 201 upon receiving the message from the communication medium 201, the transacted message is still reversibly received from the communication medium 201.

Returning to FIG. 3, whether the message is non-transacted or transacted, the context associated with the message is then identified (act 302). Referring to FIG. 2, the correlation component 212 examines the message body, message headers, local message delivery properties, application state, external databases, and/or other data sources to determine the context associated with the message. The correlation component 212 may, for example, associate the context with the message using a mechanism such as a local message delivery property.

The queue demultiplexer component 213 determines whether or not the context correlates to a currently existing message transfer session (decision block 303). If the context does not correlate to a currently existing message transfer session (No in decision block 303), a new message transfer session is created (act 304). Furthermore, the message is assigned to the newly created message transfer session (act 305).

If, one the other hand, the context correlates to a currently existing message transfer session (Yes in decision block 303), the message is still assigned to a message transfer session (act 306). However, there are a number of ways that this might be accomplished. For instance, the message may simply be placed at the back of the current existing message transfer session. This would work for any non-transacted message, or for a transacted message that is permitted to be placed in the same message transfer session as other messages from the same transaction. However, for transacted messages that are not permitted to be placed in the same message transfer session as other messages, in order to keep the usual guarantees hoped for in a transaction, the transaction boundaries may be aligned with a message transfer session. In other words, a message transfer session is to contain only a single transacted message. In the case of a transaction that contains multiple messages to be processed collectively as a transaction, those messages may be included as a batch in a single transacted message.

Figure 5:
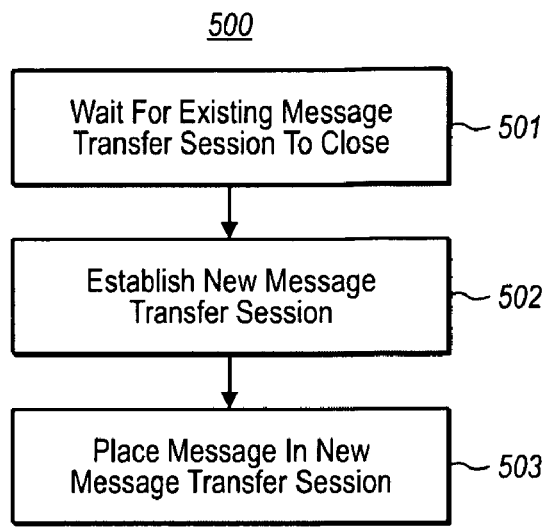
FIG. 5 illustrates a flowchart of a method for assigning a message to a message transfer session in the case where the context of a message already corresponds to a currently existing message transfer session.

In order to handle this transacted message case in which there is to be only one transacted message per message transfer session, a second option for performing the act 306 is presented in conjunction with FIG. 5. That said, FIG. 5 might be performed when processing non-transacted messages as well. FIG. 5 illustrates a as flowchart of a method 500 for assigning a message to a message transfer session in the case where the context of a message already corresponds to a currently existing message transfer session (Yes in decision block 303).

In this case, instead of assigning the message to the currently existing message transfer session, the demultiplexer component 213 temporarily waits for the currently existing message transfer session to complete and close (act 501). Furthermore, a new message transfer session is established that corresponds to the same context as the just-closed message transfer session (act 502). Finally, the message is placed in the new message transfer session (act 503). The queue demultiplexer component 213 may place the message into the pending message component 214 while the demultiplexer component is waiting for the existing message transfer session to close. If there are multiple messages with the same context waiting in the pending message component 214, the demultiplexer handles only one message at a time in an existing message transfer session. Once that message transfer session closes, the next message having that same context is placed in a new message transfer session corresponding to that same context. Thus, each message is placed into its own message transfer session, even for messages that have the same context.

Once a message is assigned into a corresponding message transfer component, a higher level component may draw that message at any time that it deems appropriate. Once a higher level component processes a message, the message processing pipeline 210 will receive an acknowledgement indicating whether or not the processing of the message was successful.

Figure 6:
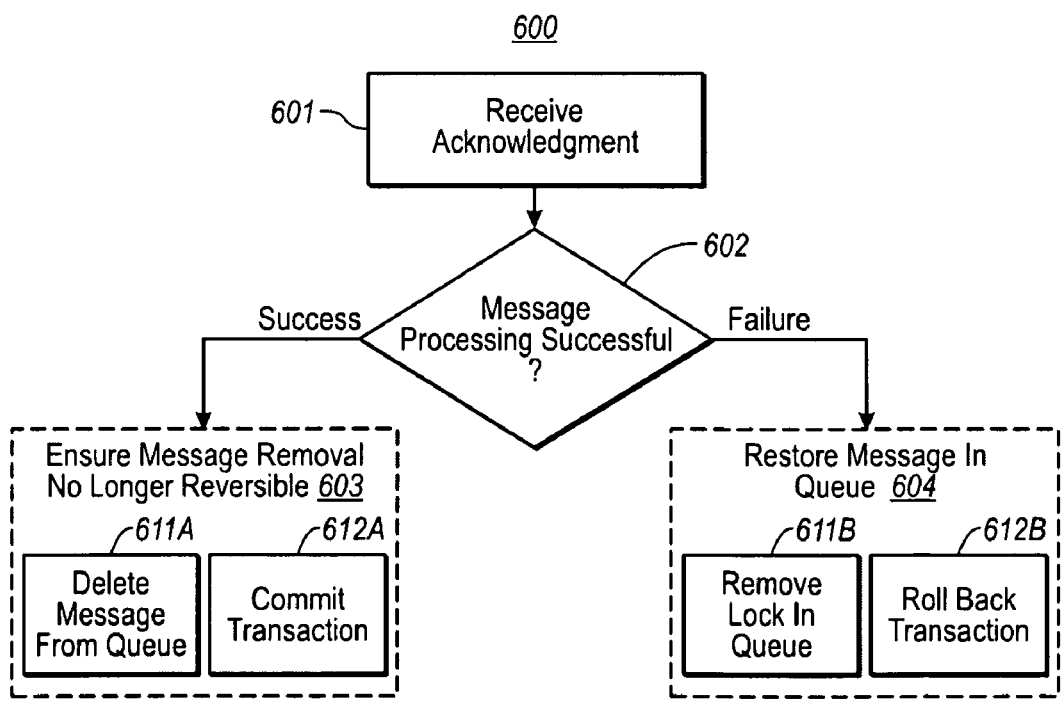
FIG. 6 illustrates a flowchart of a method for responding to acknowledgement of message processing.

FIG. 6 illustrates a flowchart of a method 600 for responding to acknowledgement of message processing. Upon receiving that acknowledgement (act 601), the message processing pipeline then determines whether the acknowledgement indicates successful processing of the message (decision block 602).

If the acknowledgement is determined to indicate successful processing of the message (Success in decision block 602), the removal of the message from the queue-like communication medium is ensured to be no longer reversible (act 603), at least absent any further attempts by the sender or a third party to reinject the message back into the queue-like communication mechanism. In the non-transacted message case, this may be accomplished by deleting the message from the queue-like communication medium (act 611A). In the transacted message case, this may be accomplished by committing the transaction (act 611B) that was initiated when the transacted message was received from the communication medium.

If the acknowledgement is not determined to indicate successful processing of the message (Failure in decision block 602), the message is restored in the queue-like communication medium to its state that existed just prior to the message being reversibly received from a queue-like communication medium (act 604). In the non-transacted message case, this may be accomplished removing the lock from the message in the queue-like communication medium (act 612A). Thus, the message is then free to be once again processed when it is next received from the communication mechanism. In the transacted message case, the transaction may be rolled back such that the message is restored into the queue-like communication medium (act 612B).

Figure 7:
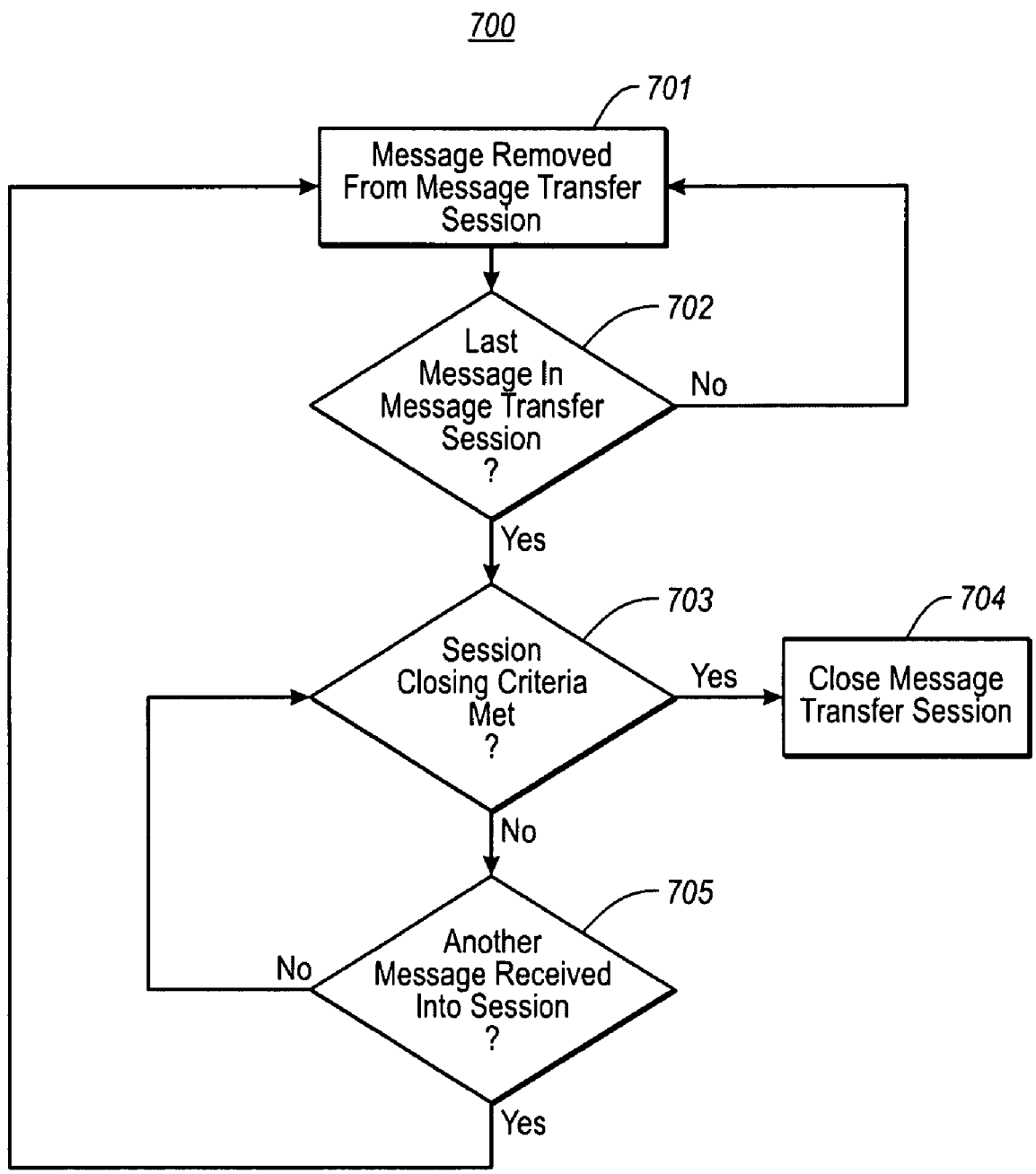
FIG. 7 illustrates a flowchart of a method for responding to the removal of a message from the message transfer session.

FIG. 7 illustrates a flowchart of a method 700 for responding to the removal of a message from the message transfer session. In one optimization, if there is an empty message transfer session, the session is not closed immediately, but is kept open for some time until some criteria are satisfied. Of course, in the embodiment in which there is only one message per message transfer session, this would not apply since the message transfer session may be closed immediately upon consuming the message from the session. However, this optimization may be more beneficially applied in the case where there may be multiple messages per message transfer session.

In this optimization case, upon removing a message from a message transfer session (act 701), if the message is not the last message left in the message transfer session (No in decision block 702), no immediate action is warranted. Instead, the method awaits the next removal of a message from the message transfer queue (act 701), at which time the method 700 may once again initiate.

If the message is the last message left in the message transfer session (Yes in decision block 702), it is then determined whether or not the session closing criteria are met (decision block 703). If the closing criteria are met at some point (Yes in decision block 703), without there being a new message added to the message transfer session in the intervening time period (Yes in decision block 705), then the message transfer session is closed (act 704).

If the session closing criteria are not met (No in decision block 703), and another message is received into message transfer session (Yes in decision block 705), the method then waits for the next message to be removed from the message transfer session (act 701).

Accordingly, the embodiments described herein present an effective mechanism for dispatching message to multiple consumers using a single physical queue-like mechanism and using deferred acknowledgement, where the message may be non-transacted message or transacted message. The present invention may be embodied in other specific forms without departing from its spirit or essential as characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more computer-readable storage media having thereon one or more computer-executable instructions that are structured such that, when executed by one or more processors of a computing system, cause the computing system to perform a method for dispatching an incoming message from a queue-like communication medium into one of one or more message transfer sessions from which one or more message consumers may draw messages, the queue-like communication medium comprising at least one of a queue, a file system, a database, a mailbox, or a File Transfer Protocol server, the method comprising:

an act of accessing a message from the queue-like communication medium without removing the message from the queue-like communication medium, the message comprising a non-transacted message that is accessed independently of a transaction event that enables rollback;

in conjunction with the act of accessing the message, an act of locking the message in the queue-like communication medium such that the message is not accessible while the message is locked, but is rather skipped when messages are subsequently accessed from the queue-like communication medium while the message is locked and prior to the message being provided to a message consumer;

an act of identifying a context associated with the message;

an act of determining whether or not the context correlates to a currently existing message transfer session;

if the context correlates to the currently existing message transfer session, an act of assigning the message to the currently existing message transfer session to be provided to the message consumer; and if the context does not correlate to any currently existing message transfer session, an act of creating a message transfer session and assigning the message to the newly created message transfer session to be provided to the message consumer.

2. A computer program product in accordance with claim 1, wherein the one or more computer-readable media are physical memory and/or storage media.

3. A computer program product in accordance with claim 2, wherein the one or more computer-executable instructions are further structured such that the method further comprises the following upon receiving an acknowledgement of processing of the message by a consumer:

an act of determining whether the acknowledgement indicates successful processing of the message;

if the acknowledgement is determined to indicate successful processing of the message, an act of deleting the message from the queue-like communication medium; and if the acknowledgement is not determined to indicate successful processing of the message, an act of removing the lock from the message in the queue-like communication medium.

4. A computer program product in accordance with claim 2, wherein the one or more computer-executable instructions are structured such that the message may be a single message or even contain a plurality of messages.

5. A computer program product in accordance with claim 2, wherein the one or more computer-executable instructions are structured such that if the context correlates to a currently existing message transfer session, the act of assigning the message to a message transfer session comprises:

an act of assigning the message to the current existing message transfer session.

6. A computer program product in accordance with claim 2, wherein the one or more computer-executable instructions are structured such that if the context correlates to a currently existing message transfer session, the act of assigning the message to a message transfer session comprises:

an act of temporarily waiting for the currently existing message transfer session to complete and close;

an act of creating a new message transfer session that corresponds to the same context as the just closed message transfer session; and an act of placing the message in the new message transfer session.

7. A computer program product in accordance with claim 2, wherein the one or more computer-executable instructions are structured such that if a message is removed from one of the existing message transfer sessions, the method further includes:

an act of closing the existing message transfer session.

8. A computer program product in accordance with claim 7, wherein the one or more computer-executable instructions are further structured such that the method includes the following prior to the act of closing the existing message transfer session:

an act of determining that one or more predetermined message transfer session closing criteria have been met.

9. A computer program product comprising one or more computer-readable storage media having thereon one or more computer-executable instructions that are structured such that, when executed by one or more processors of a computing system, cause the computing system to perform a method for dispatching an incoming message from a queue-like communication medium into one of one or more message transfer sessions from which one or more message consumers may draw messages, the queue-like communication medium comprising at least one of a queue, a file system, a database, a mailbox, or a File Transfer Protocol server, the method comprising:

an act of accessing a message from the queue-like communication medium while removing the message from the queue-like communication medium, wherein the message is reversibly removed such that if processing of the message fails, the message is restored back into the queue-like communication medium;

an act of determining that the message is to be treated as part of a transaction that has not yet been initiated;

in response to determining that the message is to be treated as part of a transaction that has not yet been initiated, an act of initiating a transaction that, if rolled back, would restore the message into the queue-like communication medium;
an act of identifying a context associated with the message;
an act of determining whether or not the context correlates to a currently existing message transfer session;
if the context correlates to the currently existing message transfer session, an act of assigning the message to the currently existing message transfer session;
wherein the one or more computer-executable instructions are structured such that if the context correlates to a currently existing message transfer session, the act of assigning the message to a message transfer session further comprises:
  an act of temporarily waiting for the currently existing message transfer session to complete and close;
  an act of creating a new message transfer session that corresponds to the same context as the just closed message transfer session; and
  an act of placing the message in the new message transfer session;
if the context does not correlate to any currently existing message transfer session, an act of creating a message transfer session and assigning the message to the newly created message transfer session; and
upon receiving an acknowledgement of processing of the message by a consumer, performing the following:
  an act of determining whether the acknowledgement indicates successful processing of the message; and
  if the acknowledgement is not determined to indicate successful processing of the message, an act of rolling back the transaction such that the message is restored into the queue-like communication medium.

10. A computer program product in accordance with claim 9, wherein the one or more computer-readable storage media comprises system memory.

11. A computer program product in accordance with claim 9, wherein the reversible removal is enforced by a sender of the message or another third party computing system.

12. A computer program product comprising one or more computer-readable storage media having thereon one or more computer-executable instructions that are structured such that, when executed by one or more processors of a computing system, cause the computing system to perform a method for dispatching an incoming message from a queue-like communication medium into one of one or more message transfer sessions from which one or more message consumers may draw messages, the queue-like communication medium comprising at least one of a queue, a file system, a database, a mailbox, or a File Transfer Protocol server, the method comprising:
  an act of accessing a message from the queue-like communication medium while removing the message from the queue-like communication medium, wherein the message is reversibly removed such that if processing of the message fails, the message is restored back into the queue-like communication medium;
  an act of determining that the message is to be treated as part of a transaction that has already been initiated;
  an act of identifying a context associated with the message;
  an act of determining whether or not the context correlates to a currently existing message transfer session;
  if the context correlates to the currently existing message transfer session, an act of assigning the message to the currently existing message transfer session;
  wherein the one or more computer-executable instructions are structured such that if the context correlates to the currently existing message transfer session, the act of assigning the message to the currently existing message transfer session comprises:
    an act of determining that the message may be placed in the currently existing message transfer session along with one or more other messages that correspond to the same transaction; and
    an act of assigning the message to the currently existing message transfer session;
  if the context does not correlate to any currently existing message transfer session, an act of creating a message transfer session and assigning the message to the newly created message transfer session; and
  upon receiving an acknowledgement of processing of the message by a consumer, performing the following:
    an act of determining whether the acknowledgement indicates successful processing of the message; and
    if the acknowledgement is not determined to indicate successful processing of the message, an act of rolling back the transaction such that the message is restored into the queue-like communication medium.

13. A computer program product comprising one or more computer-readable storage media having thereon one or more computer-executable instructions that are structured such that, when executed by one or more processors of a computing system, cause the computing system to perform a method for dispatching an incoming message from a queue-like communication medium into one of one or more message transfer sessions from which one or more message consumers may draw messages, the queue-like communication medium comprising at least one of a queue, a file system, a database, a mailbox, or a File Transfer Protocol server, the method comprising:
  an act of accessing a message from the queue-like communication medium while removing the message from the queue-like communication medium, wherein the message is reversibly removed such that if processing of the message fails, the message is restored back into the queue-like communication medium;
  an act of determining that the message is to be treated as part of a transaction that has already been initiated;
  an act of identifying a context associated with the message;
  an act of determining whether or not the context correlates to a currently existing message transfer session;
  if the context correlates to the currently existing message transfer session, an act of assigning the message to the currently existing message transfer session;
  wherein the one or more computer-executable instructions are structured such that if the context correlates to the currently existing message transfer session, the act of assigning the message to the currently existing message transfer session comprises:
    an act of determining that the message may not be placed in the currently existing message transfer session along with one or more other messages that correspond to the same transaction; and
    an act of temporarily waiting for the currently existing message transfer session to complete and close;
    an act of creating a new message transfer session that corresponds to the same context as the just closed message transfer session; and
    an act of placing the message in the new message transfer session;
  if the context does not correlate to any currently existing message transfer session, an act of creating a message transfer session and assigning the message to the newly created message transfer session; and upon receiving an acknowledgement of processing of the message by a consumer, performing the following:

an act of determining whether the acknowledgement indicates successful processing of the message; and if the acknowledgement is not determined to indicate successful processing of the message, an act of rolling back the transaction such that the message is restored into the queue-like communication medium.

14. A computer-implemented method for dispatching an incoming message from a queue-like communication medium into one of a one or more message transfer sessions from which one or more message consumers may draw messages, the queue-like communication medium comprising at least one of a queue, a file system, a database, a mailbox, or a File Transfer Protocol server, the method comprising:

an act of reversibly receiving a message from a queue-like communication medium;

an act of identifying a context associated with the message;

an act of determining whether or not the context correlates to a currently existing message transfer session;

whenever the context correlates to a currently existing message transfer session and the message is determined to be a non-transacted message, an act of assigning the non-transacted message to a message transfer session;

whenever the context correlates to a currently existing message transfer session and the message is a transacted message, waiting until the existing message transfer session ends and then assigning the message to a new message transfer session having the same context;

if the context does not correlate to a currently existing message transfer session, an act of creating a message transfer session and assigning the message to the newly created message transfer session;

an act of receiving an acknowledgement of processing of the message by a consumer;

an act of determining whether the acknowledgement indicates successful processing of the message;

if the acknowledgement is determined to indicate successful processing of the message, an act of ensuring that the removal of the message from the queue-like communication medium is no longer reversible; and if the acknowledgement is not determined to indicate successful processing of the message, an act of restoring the message in the queue-like communication medium to its state that existed just prior to the act of reversibly receiving a message from a queue-like communication medium.

15. A method in accordance with claim 14, wherein the act of reversibly receiving a message from a queue-like communication medium comprises:

an act of accessing the message from the queue-like communication medium without removing the message from the queue-like communication medium; and in conjunction with the act of accessing the message, an act of locking the message in the queue-like communication medium such that the message is not accessible while the message is locked, but is rather skipped when messages are subsequently accessed from the queue-like communication medium while the message is locked.

16. A method in accordance with claim 15, wherein the one or more computer-executable are structured such that if the acknowledgement is determined to indicate successful processing of the message, the act of ensuring that the removal of the message from the queue-like communication medium is no longer reversible comprises:

an act of deleting the message from the queue-like communication medium.

17. A method in accordance with claim 16, wherein the one or more computer-executable are structured such that if the acknowledgement is not determined to indicate successful processing of the message, the act of restoring the message in the queue-like communication medium to its state that existed just prior to the act of reversibly receiving a message from a queue-like communication medium comprises:

an act of removing the lock from the message in the queue-like communication medium.

18. A method in accordance with claim 14, wherein the act of reversibly receiving a message from a queue-like communication medium comprises:

an act of accessing a message from the queue-like communication medium; and in conjunction with the act of accessing the message, an act of initiating a transaction that, if rolled back, would restore the message into the queue-like communication medium.

19. A method in accordance with claim 18, wherein the one or more computer-executable are structured such that if the acknowledgement is determined to indicate successful processing of the message, the act of ensuring that the removal of the message from the queue-like communication medium is no longer reversible comprises:

an act of committing the transaction.

* * * * *